Aug. 22, 1933.  W. L. NAHM  1,923,579
DELINTER
Filed April 25, 1930   3 Sheets-Sheet 1

INVENTOR.
Warren L. Nahm
BY
Townsend, Loftus & Abbett
ATTORNEYS.

Aug. 22, 1933.                W. L. NAHM                 1,923,579
                               DELINTER
                        Filed April 25, 1930         3 Sheets-Sheet 2
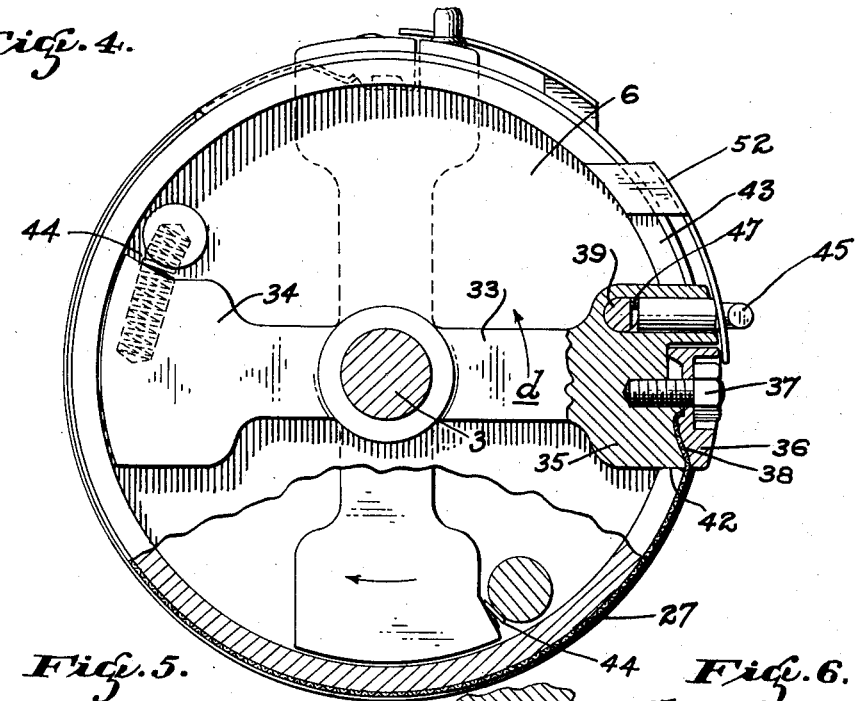
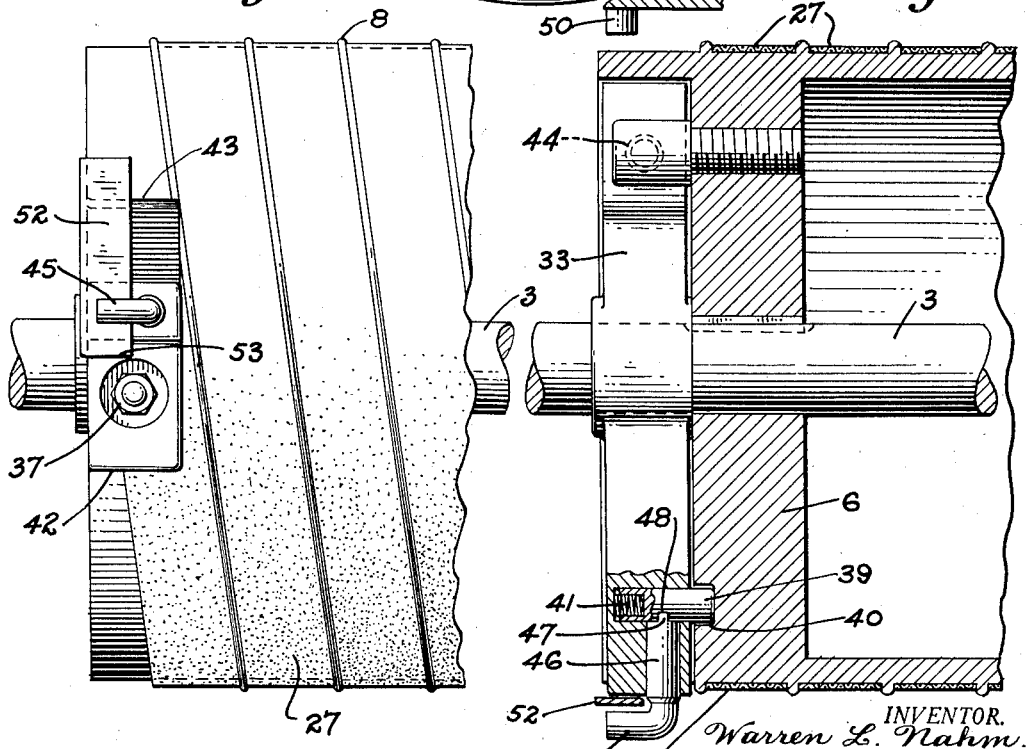
INVENTOR.
Warren L. Nahm.
BY
Townsend, Loftus & Abbett
ATTORNEYS.

Aug. 22, 1933.     W. L. NAHM     1,923,579
DELINTER
Filed April 25, 1930     3 Sheets-Sheet 3

INVENTOR.
Warren L. Nahm.
BY
Townsend, Loftus & Abbett
ATTORNEYS.

Patented Aug. 22, 1933

1,923,579

UNITED STATES PATENT OFFICE 1,923,579

DELINTER

Warren L. Nahm, Oakland, Calif.

Application April 25, 1930. Serial No. 447,215

12 Claims. (Cl. 19—43)

This invention relates to a machine for removing lint and especially to a machine whereby lint is removed from cotton seed and the like.

The purpose of cotton gins, as is well known, is that of separating the seeds from the cotton fibers. There are several types of cotton gins and all have a common defect, to-wit, that of leaving considerable lint on the exterior surfaces of the seeds and while this need not be considered as an economical loss of any great importance it is nevertheless very objectionable when the seed is to be further treated for the removal of oil, etc.

Cotton seed after the removal of the cotton fiber, yields upon pressure a large amount of yellow oil, with a bland, nut-like taste closely resembling olive oil as a substitute or adulterant for which it is largely used. The residue after the extraction of the oil, called cotton-cake, is valuable as a feed for cattle and is also used as a fertilizer. The quantity and quality of the oil obtained is somewhat dependent upon the lint content of the seed and the value of the cotton-cake as stock feed depends upon the same condition as any considerable quantity of lint in the cotton-cake renders it indigestible and decidedly limits the amount that may be fed to the cattle.

The object of the present invention is to provide a machine which is especially designed to remove the lint from cotton seed after the fiber has been removed by the cotton gin. The invention briefly stated comprises a cylinder covered with an abrasive material and supported to be rotated at a fairly high speed. A housing encloses the cylinder and forms a chamber at one side thereof. Means are provided for delivering or feeding lint covered cotton seed into one end of the chamber; means are provided for bringing the seed into contact with the abrasive surface of the cylinder; means are provided for removing and gathering lint removed from the seed by the abrasive surface on the cylinder; and means are provided for removing the de-linted or cleaned seed.

The de-linting machine is shown by way of illustration in the accompanying drawings, in which—

Figure 1:
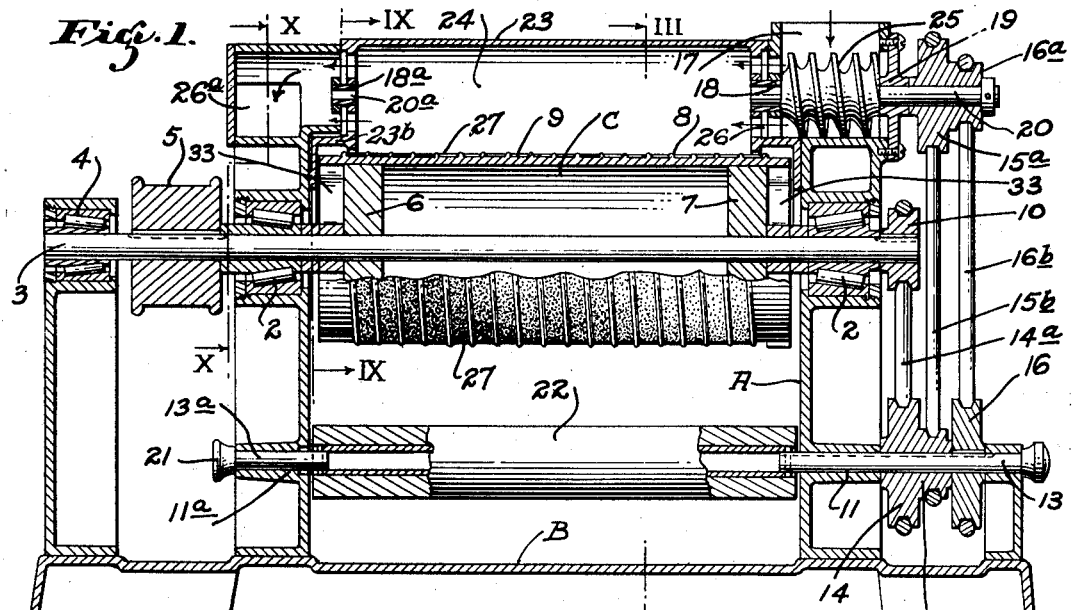
Fig. 1 is a central vertical longitudinal section of the machine.
Figure 7:
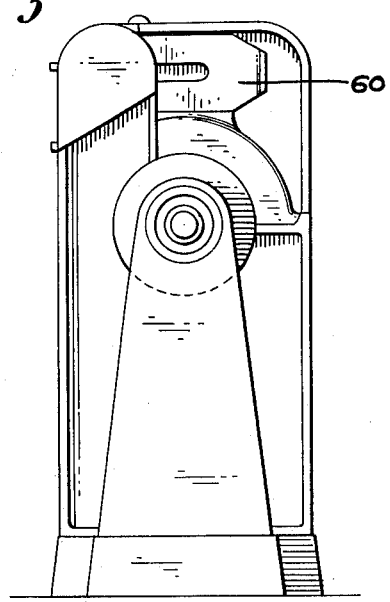
Figure 8:
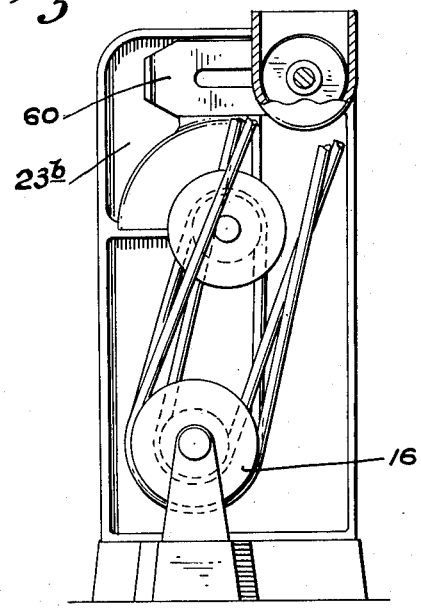
Figure 9:
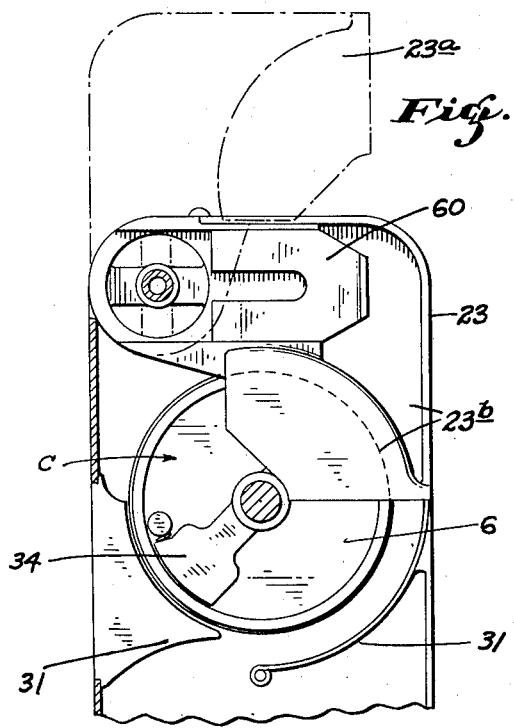
Figure 10:
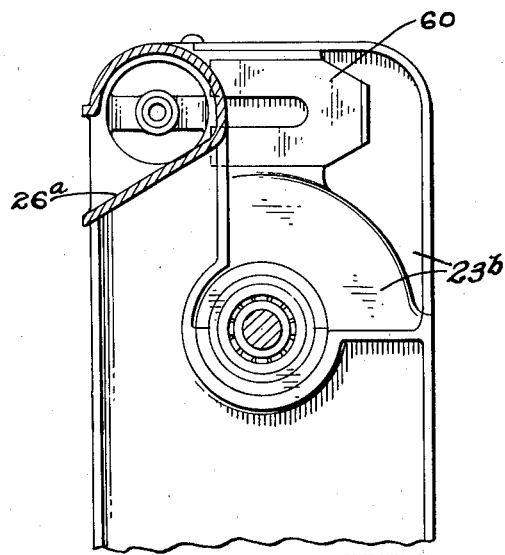

Fig. 4 is an end view partially in section of the cylinder to which the abrasive material is applied, Fig. 5 is a plan view of one end of said cylinder, Fig. 6 is a sectional view of one end of the cylinder, Fig. 7 is a view of one end of the machine, Fig. 8 is an end view of the opposite end of the machine, Fig. 9 is a vertical cross section taken on line IX—IX of Fig. 1, and Fig. 10 is a vertical cross section taken on line X—X of Fig. 1.

Figure 2:
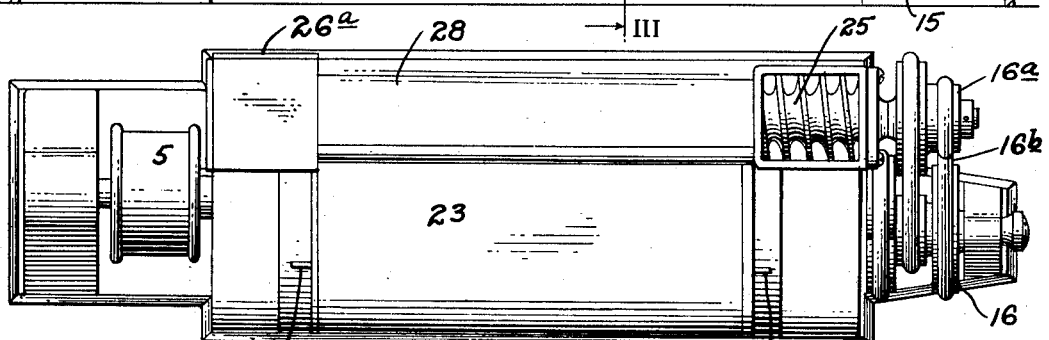
Fig. 2 is a plan view of the machine.
Figure 3:
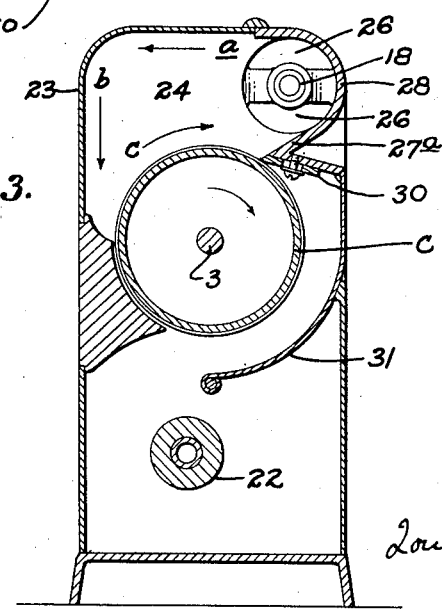
Fig. 3 is a vertical cross section taken on line III—III of Fig. 1.

Referring to the drawings in detail and particularly Figs. 1, 2 and 3, A indicates a main frame or housing supported by a base or plate such as indicated at B. Formed on the side walls of the housing are anti-friction journal bearings 2—2 and extending through said journals and the housing is a drive shaft 3, one end of the shaft being supported by an outboard bearing 4 to form a support for a driving pulley 5 which is keyed or otherwise secured to the shaft. Secured to the shaft within the housing or frame A is a cylinder generally indicated at C, the cylinder being provided with head members 6 and 7 at opposite ends which are keyed or otherwise secured to the shaft 3. The exterior surface of the cylinder is provided with a helical rib 8, the rib being pitched or spaced to form an intermediate helical space 9 for the reception of a strip of abrasive material hereinafter to be described.

Secured to the drive shaft 3 on the end opposite the driving pulley 5 is a pulley 10. Journaled in bearings 11 secured to the frame and disposed below the bearing 2 is a shaft 13 and freely journaled thereon are a pair of integral pulleys 14 and 15 while keyed on the shaft 13 is a pulley 16. Formed above the bearing 2 is a feed hopper 17. Formed on opposite ends of said hopper are bearings 18 and 19 and extending through said bearings is a shaft 20 on which is keyed or otherwise secured a pair of integral pulleys 15a and 16a, pulley 14 being driven from pulley 10 by means of a belt 14a, pulley 15a being driven by pulley 15 through belt 15b and pulley 16 being driven from pulley 16a by a belt 16b and as pulley 16 is keyed or splined to the shaft 13, shaft 13 will be rotated at a reduced speed with comparison to the drive shaft 3 due to the speed reduction obtained through the pulleys 14, 15, 15a, 16a and 16.

Formed and secured to the housing or frame A at a point opposite the bearing 11 is a bearing 11a and journaled therein is a shaft 13a, the shafts 13 and 13a being provided with head members 21 whereby they may be pulled in an outward direction to release a lint gathering roller generally indicated at 22, this roller being designed to receive the ends of the shafts 13 and 13a and to be driven by shaft 13 at a reduced speed as described. A bearing 18a is formed on the housing at a point opposite the bearing 18. Bearing 18 supports one end of the shaft 20 while bearing 18a supports a short shaft 20a, the inner ends of the shafts 20 and 20a forming a pivotal support for a cover member 23 clearly shown in Figs. 1, 3 and 9, this cover being shown in its closed position in Fig. 9 and also in its open position by dotted lines at 23a. Cover 23 together with the housing A forms a chamber generally indicated at 24 which extends from end to end of the cylinder C. The cover is provided with end sections 23b to prevent the seed from escaping around the ends of the cylinder. The end sections also serve the function of a partial cover member for each end of the cylinder and as a support for a pair of pins 50 hereinafter to be described.

A helical feed worm 25 is secured on shaft 20 within the feed hopper 17 and when cotton seed is delivered to the feed hopper it is fed through openings 26 formed around the bearing 18, see Fig. 3, into one end of the chamber 24. The seed drops by gravity into contact with the face of the cylinder C and as this is rotating at a comparatively high speed the seed is thrown up against a deflector plate 27a which is rounded at its upper end as shown at 28 and the seed directed by the rounded portion in the direction of arrow a against the cover and by the cover the seed is deflected downwardly in the direction of arrow b where the seed again engages the surface of the cylinder and the seed is thus maintained in constant circulation within the chamber 24 first in the direction of arrow a, b and c, and secondly the seed is moved longitudinally of the chamber 24 due to the continuous introduction by the feed worm 25 of seed to be cleaned. In fact when the machine is in operation chamber 24 is substantially filled with seed from end to end, seed being continuously delivered by the feed worm 25 and being continuously discharged around bearing 18a into a discharge chute 26a.

The abrasive material preferably employed is a strip of fabric or the like such as indicated at 27, see Figs. 5 and 6, which is wound between the helical ribs 8. The abrasive employed may be carborundum or the like applied to the exterior surface of the tape or strip in any suitable manner. It is also preferable that the abrasive material increase in coarseness towards the discharge end of the cylinder, for instance, the first few turns of the strip may be faced with a comparatively fine abrasive, the next few turns of the strip covering the center of the cylinder would be covered or faced with a slightly coarser abrasive and the last few turns will be faced with the coarsest abrasive. The seeds when entering chamber 24 are of course heavily covered with lint and as they come in contact with the fine abrasive a certain proportion of the lint adheres to the abrasive and is removed thereby, the seed is of course turned over and over due to the circulation thereof shown in Fig. 3 so that all surfaces come in contact with the abrasive and as the seed is moved longitudinally within the chamber 24 it comes in contact with the medium grade of abrasive and finally in contact with the coarsest grade. The longer lint is easily removed hence the reason for removing it with the fine abrasive but as the lint becomes shorter and shorter a coarser and coarser abrasive is required, the coarser abrasive causing removal of the finest lint and insures the discharge of perfectly clean and almost polished seed.

The lint removed by the abrasive adheres thereto and passes under a knife or baffle plate such as shown at 30. It is thrown off by centrifugal action and drops on a rounded deflecting plate such as shown at 31 which in turn delivers it to the surface of the slowly rotating roller indicated at 22. It gathers on this roller and when a sufficient amount is gathered the roller may be removed and a new roller inserted.

In actual practice it is found that it is very essential to maintain the abrasive strip in tight engagement with the exterior surface of the cylinder for the simple reason that the tape tends to stretch as it is subjected to wear. Such stretching might cause the tape to become sufficiently loose to rub against the deflector plate or knife 30 and it might cause it to jump the helical rib 8 thereby causing overlapping of the strips and reduction of the abrasive surface presented. Means are accordingly provided at each end of the cylinder for maintaining the strip in a taut condition, this means or mechanism being best illustrated in Figs. 4, 5 and 6. Pivotally mounted on the shaft 3 at each end of the cylinder is an arm 33, one end of each arm is counter-weighted as shown at 34 and the opposite ends are provided with heads 35 carrying clamping members 36. These clamping members are secured by bolts 37 and the ends of the tapes are secured between the heads 35 and the clamps 36 as shown at 38 by tightening up on the bolts 37. Similarly, if the tape or strip is removed the bolts are loosened and removed and so are the clamps 36 thereby freeing the ends of the abrasive strip and permitting unwinding and removal thereof. Each head member 35 carries a latching pin 39 which is normally projected into a recess or keeper 40 formed in each head member 6 and 7, the latches being maintained in engagement with the keepers by springs 41. The outer ends of the cylinder are notched or cut away between shoulders indicated at 42 and 43 and the arms 33 are thus free to swing about the shaft 3 between the limits of the shoulders 42 and 43. The counterweight 34 on each arm is engaged by a spring 44, the spring action being such as to swing the arms 33 about the shaft 3 in the direction of arrow d, or in other words, to force the head members 35 into engagement with the shoulder 43. The springs 44 are reversed causing the arm 33 on one end of the cylinder to swing in the direction of arrow d and the arm on the opposite end of the cylinder to swing in the opposite direction and as the free ends of the strip are secured to respective arms a pull will be continuously exerted in opposite directions thus retaining the tape in a taut condition on the surface of the cylinder.

Machines of this character are usually operated by unskilled labor and it is accordingly essential that a new strip cannot be applied until the arms 33 have been swung to engage the shoulders 42 and secured by the latches 39. In this position the clamps 36 may be removed so as to permit unwinding of the old abrasive strip and replacement thereof by a new abrasive strip which is secured by applying the clamps 36 and bolts 37, thereafter the latches 39 may be released so as to permit the spring tension 44 to be applied to the respective arms so as to exert a continuous pull on the free ends of the abrasive strips. The latches 39 are each provided with releasing levers 45 which may be either manually or automatically released. The levers 45 are formed on the outer ends of pins 46 which are provided with an eccentric pin 47 at their inner ends. These pins engage a cross slot 48 formed on one side of the latches 39, hence by rotating the pins 46 through means of the levers 45 the latches 39 may be either extended or retracted. After the tape has been applied the levers 45 should be manually turned to release the latches 39 so as to permit the spring tension to be applied to the abrasive strip but as unskilled labor is employed it may happen that release of the latches 39 is forgotten or neglected and if that is the case the abrasive strip would gradually become slack when subjected to wear.

In the present instance means are provided for automatically rotating the levers 45 so as to release the latches 39 the moment the machine is started for operation. This is accomplished by placing a pair of pins 50 at each end of the cover 23. These pins will engage the levers 45 during the first revolution of the cylinder and as such will rotate them to release and retract the latches 39, hence permitting spring tension to be automatically applied when the cylinder has made one rotation. Means are also provided for preventing removal of the old abrasive strip and replacement thereof with a new strip until the head members 35 have been swung to a position where they may be locked by the latches 39. This is accomplished by placing a shield over the recess formed between the shoulders 42 and 43. This shield is plainly shown at 52, see Fig. 5, it merely consists of an angle plate bolted, welded or otherwise secured to each end of the cylinder. The angle plate extends from the shoulder 43 to the point indicated at 53, hence leaving sufficient space between the shoulder 42 and the shield 52 to permit a socket wrench or the like to be inserted to remove the bolt 37. That is, space is provided when arms 33 are moved to the position shown in Figs. 4 and 5 where they may be locked by the latches 39 as the bolts 37 will then swing into the space formed between the shoulder 42 and the end of the shield indicated at 53. But if arms 33 are not swung to assume this position bolts 37 will assume some point intermediate the shoulders 42 and 43, or in other words, a point in under the shield 52 where they cannot be reached as a wrench cannot be introduced to release them, hence the operator is forced when desiring to remove the old abrasive strip to swing both arms 33 back against the shoulder 42 and there lock them by means of the latches 39, as it is impossible to remove the bolts 37 in any other position. In this position a socket wrench or the like may be introduced to release the bolts 37 and the clamps 36, they may thus be removed to permit unwinding of the old abrasive strip and replacement of a new abrasive strip and when the new abrasive strip has been applied the free ends are placed on top of the head members 35 and there secured by the clamps 36 and bolts 37. The operator should then manually rotate the levers 45 to release the latches 39 but if this is forgotten the levers are automatically rotated by pins 50 during the first rotation of the cylinder thus automatically releasing the latches 39 so as to cause the springs 44 to exert a continuous pull on the free ends of the abrasive strips.

In actual operation the cotton seed covered with lint is delivered to the hopper 17 in any suitable manner and it is here continuously delivered to one end of chamber 24 by means of the feed screw or auger 25. Chamber 24 will under actual operation be substantially filled with seed. The whole body of seed will be rotating about the longitudinal axis of the chamber 24 as indicated by the arrows $a$, $b$ and $c$ and the whole body of seed will at the same time move slowly in a longitudinal direction. Due to the rotary motion of the mass about the longitudinal axis of the chamber, each individual seed is turned over and over so as to present new surfaces to be engaged by the abrasive material on the cylinder. The contact of the seed with the abrasive material is of course intermittent but as the seed is continuously rotating and gradually traveling in a longitudinal direction through the chamber it is possible that it contacts with the abrasive material several hundred times before discharging into the chute 26a. Practical experience has shown that the number of contacts made by the abrasive material is sufficient as the seed discharging is completely free of lint and if anything presents a polished surface. If a small percentage of the lint is found on the seed it is merely necessary to reduce the amount of seed delivered to the chamber, this being accomplished by employing sliding gates such as shown at 60 in Figs. 7, 8, 9 and 10. There are two of these gates one adjacent the intake end of the chamber and one adjacent the discharge end. By adjusting the gates the delivery and discharge of the seed is controlled and complete removal of the lint is insured.

The machine here shown is exceedingly simple, compact and rigid in construction. Cover 23 when raised as shown by dotted lines at 23a in Fig. 9 permits free access to the cylinder to permit removal or application of the abrasive strip and a cover in the front of the machine permits ready removal or insertion of the rollers 22 whereby the lint is gathered. The automatic feature employed in conjunction with securing and maintaining the abrasive strip in a taut condition is exceedingly important as it permits the machine to be handled by practically any character of labor without danger of injury to the machine. The helical rib 8 formed on the exterior surface of the cylinder also has an important function. First of all it forms a guide and a recess for the reception of the abrasive strip which is helically wound about the cylinder; secondly, it forms a depressed surface for the reception of said strip; and third, it limits the spacing between the knife or deflecting plate 30 and the surface of the abrasive material, that is, the helical rib 8 prevents contact of the knife 30 with the abrasive material thus preventing wear of the same and at the same time maintaining a fixed space through which the lint is removed.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand, and while emery has been referred to as an abrasive or cutting material any other suitable material may be employed.

Having thus described my invention, what I claim and desire to secure by Letters Patent is—

1. In a cotton seed de-linting machine, a cylinder, a flexible strip wound helically about the cylinder and secured at opposite ends thereof, and an abrasive material carried by the strip and arranged to present successive areas of varying coarseness.

2. In a cotton seed de-linting machine, a cylinder, a flexible strip wound helically about the cylinder and secured at opposite ends thereof, and an abrasive material carried by the strip and arranged to present successive areas of varying coarseness longitudinally of the cylinder.

3. In a cotton seed de-linting machine, a cylinder, a flexible strip would helically about the cylinder and secured at opposite ends thereof, an abrasive material carried by said strip, and means for automatically maintaining the strip in a tightly wound condition on the cylinder.

4. In a cotton seed de-linting machine, a cylinder, a flexible strip wound helically about the cylinder and secured at opposite ends thereof, an abrasive material carried by said strip, and spring members engageable with the securing means to cause the same to exert a continuous pull on the ends of the strip.

5. In a cotton seed de-linting machine, a cylinder, a flexible strip wound helically about the cylinder, a pair of arms pivotally mounted one at each end of the cylinder, a clamping member on each arm to receive and secure the free ends of the strip, and a spring member engageable with the opposite end of each arm.

6. In a cotton seed de-linting machine, a cylinder, a flexible strip wound helically about the cylinder, a pair of arms pivotally mounted one at each end of the cylinder, a clamping member on each arm to receive and secure the free ends of the strip, a spring member engageable with the opposite end of each arm, a pair of stop members on each end of the cylinder between which the arms are movable, a clamping member on one end of each arm adapted to receive and secure the free ends of the strip, springs connected with the arms whereby a pull is applied to maintain the strip in a tight condition on the cylinder, and means whereby the strip cannot be released nor a new strip applied except when the springs are placed under tension.

7. In a cotton seed de-linting machine, a cylinder, a flexible strip wound helically about the cylinder, a pair of arms pivotally mounted one at each end of the cylinder, a clamping member on each arm to receive and secure the free ends of the strip, a spring member engageable with the opposite end of each arm, a pair of stop members on each end of the cylinder between which the arms are movable, a clamping member on one end of each arm adapted to receive and secure the free ends of the strip, springs connected with the arms whereby a pull is applied to maintain the strip in a tight condition on the cylinder, means whereby the strip cannot be released nor a new strip applied except when the springs are placed under tension, means for securing the arms against pivotal movement between the stop shoulders when the springs are placed under tension, and means for releasing the arms after a new strip is applied.

8. In a cotton seed de-linting machine, a cylinder, a flexible strip wound helically about the cylinder, a pair of arms pivotally mounted one at each end of the cylinder, a clamping member on each arm to receive and secure the free ends of the strip, a spring member engageable with the opposite end of each arm, a pair of stop members on each end of the cylinder between which the arms are movable, a clamping member on one end of each arm, a pair of stop members on each end of the cylinder between which the arms are movable, a clamping member on one end of each arm adapted to receive and secure the free ends of the strip, springs connected with the arms whereby a pull is applied to maintain the strip in a tight condition on the cylinder, means whereby the strip cannot be released nor a new strip applied except when the springs are placed under tension, means for automatically securing the arms against pivotal movement when the springs have been placed under tension, and means whereby rotary movement of the cylinder will automatically release the arms to permit spring tension to be applied and the strip to be maintained in a taut condition.

9. In a cotton seed de-linting machine, a rotor having an abrasive surface, a housing enclosing the rotor and forming a chamber extending from end to end of the rotor, said chamber adapted to receive and contain a body of cotton seed to be de-linted, means whereby the seed is kept moving longitudinally through the chamber and whereby each individual seed is rotated to bring different surfaces thereof into contact with the abrasive surface of the rotor, an inlet and an outlet opening formed at opposite ends of the housing and communicating with the chamber, a feed hopper arranged adjacent the inlet opening, means in the hopper for transferring the seed from the hopper to the chamber, and adjustable gates disposed adjacent the inlet and outlet openings whereby the area of said openings may be increased or decreased to regulate the amount of seed passing through the chamber.

10. In a cotton seed delinting machine, a rotor having an abrasive covering, means at each end of the cylinder whereby the abrasive covering is secured, a housing enclosing the rotor and forming a chamber extending substantially from end to end of the rotor, said chamber adapted to receive and contain a body of cotton seed to be de-linted, and means for maintaining the seed out of contact with abrasive securing means at opposite ends of the cylinder.

11. In a cotton seed de-linting machine, a rotor having an abrasive covering, means at each end of the cylinder whereby the abrasive covering is secured, a housing enclosing the rotor and forming a chamber extending substantially from end to end of the rotor, said chamber adapted to receive and contain a body of cotton seed to be de-linted, a cover member pivotally mounted on the housing to permit access to the seed chamber and the rotor, and means on said cover for partially enclosing the ends of the rotor.

12. In a cotton seed de-linting machine, a rotor having an abrasive covering, means at each end of the cylinder whereby the abrasive covering is secured, a housing enclosing the rotor and forming a chamber extending substantially from end to end of the rotor, said chamber adapted to receive and contain a body of cotton seed to be de-linted, and means for enclosing the ends of the rotor.

WARREN L. NAHM.